United States Patent [19]

Rosenthal et al.

[11] Patent Number: 4,707,714

[45] Date of Patent: Nov. 17, 1987

[54] COVERING DEVICE FOR PROTECTING THE NOZZLE AREA OF AN INK JET WRITING HEAD

[75] Inventors: Manfred Rosenthal; Jan Roulaux, both of Kirchen-Freusburg, Fed. Rep. of Germany

[73] Assignee: U.S. Philips Corporation, New York, N.Y.

[21] Appl. No.: 878,168

[22] Filed: Jun. 25, 1986

[30] Foreign Application Priority Data

Jun. 26, 1985 [DE] Fed. Rep. of Germany ....... 3522799

[51] Int. Cl.[4] ............................................ G01D 15/18

[52] U.S. Cl. ............................................... 346/140 R

[58] Field of Search ........................................ 346/140

[56] References Cited

U.S. PATENT DOCUMENTS 4,015,272 3/1977 Yamamori .......................... 346/140

4,045,802 8/1977 Fukazawa .......................... 346/140

4,300,145 11/1981 Raamsdonk ........................ 346/140

4,543,589 9/1985 Terasawa ........................... 346/140

FOREIGN PATENT DOCUMENTS 2929742 2/1981 Fed. Rep. of Germany .

3237411 4/1983 Fed. Rep. of Germany .

*Primary Examiner*—Joseph W. Hartary

*Attorney, Agent, or Firm*—Robert T. Mayer

[57] ABSTRACT

The invention relates to a covering device for protecting the nozzle area of an ink jet writing head, which device is detachably connected to the ink jet writing head in a sealing manner and forms a cavity which is opened towards the nozzles, into which cavity liquid ink is transported through the nozzles. In order to be able to store and transport an ink jet writing head filled with liquid ink for a long period of time, in particular also as an individual component, for example as a spare part, without the possibility existing the liquid ink of drying in the nozzle area and without enclosed or penetrating air bubbles that can lead to a chemical change of the liquid ink, it is ensured that the covering device (7) is form-coupled to the ink jet writing head (1) and that the cavity (8) comprises a closable ventilation duct (12) which communicates with the atmosphere.

7 Claims, 1 Drawing Figure

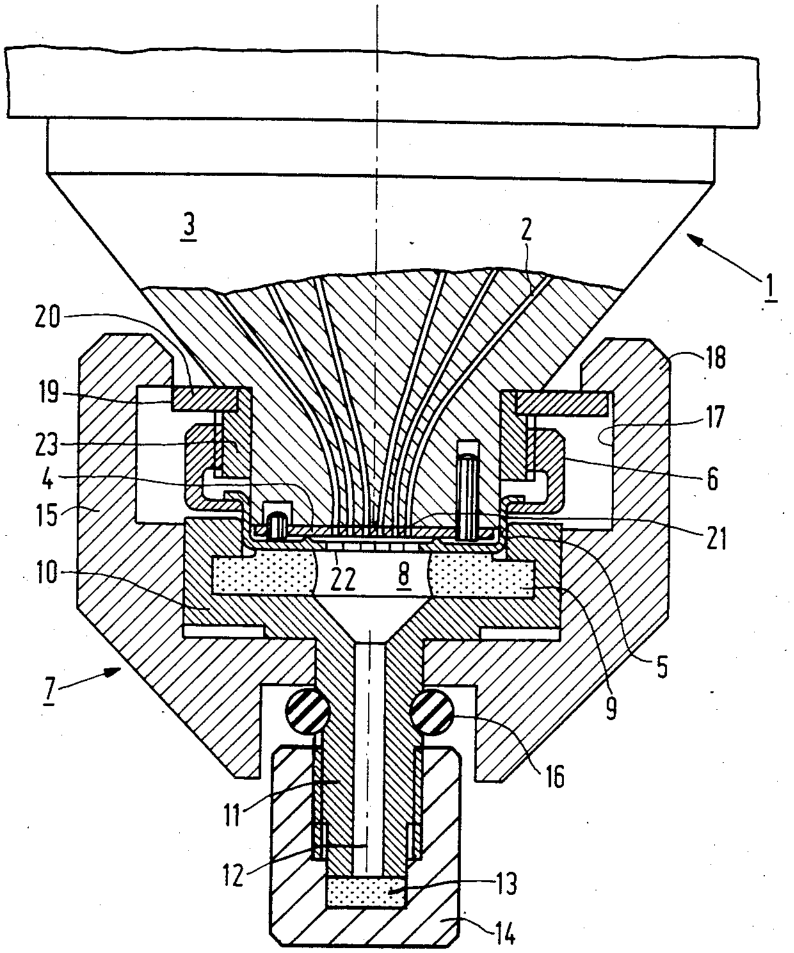
3
2
1
20
18
19
17
23
6
4
21
15
10
22
8
5
9
7
16
11
12
13
14

COVERING DEVICE FOR PROTECTING THE NOZZLE AREA OF AN INK JET WRITING HEAD

The invention relates to a convering device for protecting the nozzle area of an ink jet writing head, which device is detachable connected to the ink jet writing head in a sealing manner and forms a cavity which is open towards the nozzles, into which cavity liquid ink is transported through the nozzles.

Such covering devices known from German OS Nos. 29 29 742 and OS 32 37 411 are used as parts of a writing device to cover the ink jet writing head of the writing device at certain distances for cleaning purposes. For this purpose, such covering devices are pressed against the end face of the ink jet writing head until the cleaning process is finished.

On the contrary it is an object of the invention to provide measures to enable the storage for a long period of time and the transport of an ink jet writing head which is filled with a liquid ink, in particular also as an individual component, for example, as a spare part, avoiding the danger of the liquid ink drying up in the nozzle area and the penetration of air bubbles that can lead to a chemical change of the liquid ink.

This object is achieved in that the covering device is mated with the ink jet writing head with a cavity that comprises a closable ventilation duct which communicates with the atmosphere.

The covering device according to the invention is mated with the ink jet writing head and, during storage or transport or also during longer non-operative periods of the writing device, forms with it a unit which is sealed to the outside so that the cavity keeping the nozle area wet cannot dry up, not even after a long period of time. This unit also prevents the penetration of air in the proximity of the nozzles, which is to be feared in particular in the case of temperature fluctuations.

In order that volume variations of the liquid ink can be compensated for without noteworthy pressure variations, at least a part of the cavity may have elastically expandable walls. For the same reason, an ink compensation container which communicates with the cavity, and whose volume can be increased elastically, may advantageously be provided.

The covering device according to the invention is of a particularly simple construction and is easy to handle when it comprises an axially symmetrical element with a funnel shaped space whose filling side comprises a circular end face. It engages the end face of the ink jet writing head by way of an elastic seal surrounding the area of the nozzles and thus forms the cavity which is open towards the nozzles, and whose outflow tube comprises the ventilation duct and is closed by a screw cap.

A reliable connection possibility is obtained in that the covering device is screwed to the ink jet writing head by means of a compression nut through which the outflow tube passes. However, the covering device is preferably connected to the ink jet writing head by means of a connection cap through which the outflow tube extends centrally and which surrounds the axially symmetrical element of the covering device, said cap comprising at least two projections extending radially inwardly and provided symmetrically on the circumference, which, in a given angular possition, can be passed through leadthroughs between holding elements of the ink jet writing head and can be hooked behind said holding elements by a rotating movement.

Such holding elements can simly be formed by an annular element which has at least two flat portions which are provided symmetrically at the circumference and form the leadthroughs. Advantageously, the annular element, optionally together with a connection element serving for the connection of other auxiliary elements, may be connected to a rotationally symmetrical projection of the ink jet writing head.

A particularly reliable method of manufacturing a covering device according to the invention is characterized in that the covering device is connected to the ink jet writing head while the ventilation duct is open, that liquid ink is then transported outwards through the nozzles into the cavity of the covering device and through the ventilation duct until no air inclusions can be found in the cavity and that finally the aperture of the ventilation duct is closed.

The invention will now be described in greater detail with reference to a particularly advantageous embodiment shown in the drawing, the sole FIGURE of which is a cross-sectional view through the nozzle area of an ink jet writing head with covering device provided thereon.

The ink jet writing head 1 consists of a synthetic resin nozzle duct block 3 forming ink ducts 2 to whose end face a nozzle plate 4 is tightly fitted. The pressure forces are produced by a masking element 5 which is drawn against the nozzle plate 4 by means of a compression nut 6. The compression nut 6 is screwed on the metallic threaded ring 23 which together with an annular element 20 is connected to a cylindrical projection of the ink jet writing head.

The covering device, referenced 7, forms a cavity 8 which is filled entirely with liquid ink and extends radially inside the sealing disc 9 and on the filling side of the covering part 10 of an axially symmetrical element with a funnel-shaped space. The outflow tube 11 forms the ventilation aperture 12 which in the FIGURE is closed in an airtight manner by a seal 13 and the screw cap 14 which is screwed on external threads of the outflow tube.

A connection cap 15 is provided on the outflow tube 11 so as to be rotatable and is secured axially by a lock washer 16. The connection cap 15 comprises at least two holding arms 18 which are directed radially inwardly from the cylindrical inner surface and can be guided by flat portions 19 forming leadthroughs of the annular element 20 (left-hand half of the FIGURE) and after a rotation can be hooked behind a part of the annular element which is not flattened (right-hand half of the FIGURE). For this purpose, the connection cap 15 is forced towards the ink jet writing head, the sealing disc 9 being compressed. The connection cap 15 can then easily be rotated about the desired angle for connection purposes.

This rotation is not transmitted to the sealing disc 9 so that no detrition forces forming contamination particles are formed. The liquid ink remains pure.

For filling the cavity 8 the screw cap is removed. By means of any pumping device, for example, a hose pump, liquid ink is then pumped into the cavity 8 from a storage container through the ink ducts 2 and the nozzles 21 as well as the outflow apertures 22 of the masking element 5. The pumping operation is continued until liquid ink without air inclusions emanates from the aperture of the ventilation duct 12 which is then closed again by screwing the screw cap 14.

Advantageously it is possible to form the wall of the bottom of the screw cap 14 in the central area so as to be flexible so that the screw cap forms an ink compensation container whose volume can be elastically expanded and a volume compensation at temperature fluctuations is possible.

An ink jet writing head covered by the covering device according to the invention can be stored for a long period of time. Mechanical shock effects which inevitably occur during transport by impact loads cannot result in air reaching the proximity of the nozzles.

What is claimed is:

1. A covering device for mounting on the end face of an ink jet writing head for protecting the nozzles and the nozzle area of said writing head, which device can be detachably connected to the ink jet writing head in a sealing manner and which forms a cavity which is open toward said nozzles when said device is connected to said writing head, said cavity serving to receive liquid ink from said nozzles, said device comprising an axially symmetrical element having a circular face with an opening into a funnel shaped space leading into a closable ventilation duct which can be opened to the atmosphere, said device including a seal with an aperture, said seal being located between said end face of said writing head and said circular face of said axially symmetrical element when said device is connected to said writing head at which time said aperture and said funnel shaped space form said cavity, and a screw cap on said element closing said ventilation duct, said ventilation duct comprising an outflow tube for said device.

2. A covering device as claimed in claim 1, wherein said screw cap has a flexible area whereby when said covering device is filled with ink said screw cap can compensate for volume variations in said ink caused by temperature fluctuations.

3. A covering device as claimed in claim 1, wherein said device includes a ring like connection cap through which the outflow tube extends centrally and which surrounds the axially symmetrical element, said connection cap comprising at least two projections extending radially inwardly on its inside.

4. The combination of a covering device as claimed in claim 3 with an ink jet writing head having holding elements whereby the projections of said connection cap can be hooked behind said holding elements to connect said connection cap to said writing head.

5. The combination as claimed in claim 4 wherein the holding elements of the ink jet writing head are formed by an annular element which comprises at least two flattened portions.

6. The combination as claimed in claim 5 wherein said ink jet writing head includes a threaded ring to which said annular element is connected.

7. The combination as claimed in claim 4 wherein the covering device is connected to the ink jet writing head while the ventilation duct is open and wherein liquid ink is ejected through the nozzles into the cavity of the covering device and through the ventilation duct until all air is evacuated from said cavity and wherein the aperture of the ventilation duct is then closed.

* * * * *